United States Patent Office 3,100,215
Patented Aug. 6, 1963

3,100,215
PROCESS FOR PREPARING LIQUID
HEXAALKYL-DISTANNOXANES
Heinz Gelbert, Margarethenberg, Germany, assignor to Farbwerke Hoechst Aktiengesellschaft vormals Meister Lucius & Brüning, Frankfurt am Main, Germany, a corporation of Germany
No Drawing. Filed Aug. 15, 1960, Ser. No. 49,422
Claims priority, application Germany Aug. 21, 1959
1 Claim. (Cl. 260—429.7)

The present invention relates to a considerably simplified process for preparing liquid hexaalkyl-distannoxanes from liquid trialkyl-tinhalides.

It is known to prepare organo-tin compounds of the general formula $$R_3-Sn-O-Sn-R_3$$

by first producing from a tri-organo-tinhalide the tri-organo-stannoxane according to the equation $$R_3SnX + NaOH \rightarrow R_3SnOH + NaX$$

from which the corresponding hexa-organo-distannoxane is formed in a second reaction stage according to the equation $$2R_3SnOH \rightarrow R_3Sn-O-SnR_3 + H_2O$$

In the above formulae the 3 or 6 substitutents R respectively represent equal or different organic radicals linked to the tin atoms over a carbon atom, i.e. alkyl, cycloalkyl or aryl groups which, as far as linear compounds are concerned, may be straight-chain or branched and may, moreover, all be substituted in any desired manner. X represents halogen and preferably chlorine. As liquid organo-tinhalides that can be treated according to the process of the present invention in order to obtain liquid distannoxanes, there enter into consideration, for instance, triethyltinbromide, tri-n-propyltinbromide, tri-n-butyltinbromide, triethyltiniodide, dimethyl-ethyltinchloride and the like.

For preparing the distannoxanes, the corresponding tri-organo-tinhalide was hitherto dissolved in an organic solvent and stirred up with aqueous alkalimetal hydroxide solution, if necessary with heating. Thereby, two layers are separated off, the upper one of which contains the organic solvent with the distannoxane, the lower one the water with the akaline metal halide. The organic layer was separated off and washed, and by distilling off the organic solvent the hexa-organo-distannoxane was isolated which was purified by recrystallization or by distillation under reduced pressure. The tri-organo-tinhalide has likewise already been reacted by boiling it with alkaline sodium hydroxide or potassium hydroxide solution to hexa-organo-distannoxane in which case, however, likewise the separation of the organic solvent as well as the elimination of the water brought into the reaction mixture or formed during the reaction, caused high costs for apparatuses and required much time.

Now, we have found that liquid hexaalkyl-distannoxanes can be obtained in a simple manner by heating in the absence of organic solvents a liquid trialkyl-tinhalide of the general formula $R_3SnX$, wherein R may represent in each case an alkyl radical linked to the tin atom over a carbon atom, which alkyl radical may be substituted, and X represents a halogen atom, with a solid alkaline agent. As solid alkaline agents there enter into consideration alkali metal hydroxides, particularly sodium and potassium hydroxide as well as calcium hydroxide.

As starting material there are used liquid trialkyl-tinchlorides, trialkyl-tinbromides, and trialkyl-tiniodides, for instance trimethyl-tiniodide, triethyl-tinbromide, tri-propyl-tinchloride, tributyl-tinchloride, tripropyl-tinbromide, tributyl-tinbromide and tributyl-tiniodide.

It is operated in such a manner that, while vigorously stirring, the solid caustic potash in the form of sheds, tablets or powder is mixed into the liquid trialkyl-tinhalide. The dehydrogenation to the distannoxane takes place with evolution of heat up to about 70° C. and with very good yields of about 75–85%. It is only necessary to eliminate from the reaction mixture the water that has formed, i.e. 1 mol of $H_2O$ per mol of hexaalkyl-distannoxane formed. This elimination can easily be effected by secondary heating of the reaction mixture up to about 110° C. The liquid product obtained according to the process of the invention is then separated by filtration from the alkali metal or alkaline earth metal halide that has formed and, if desired, the hexa-organo-distannoxane is separated by distillation from unreacted tri-organo-tinhalide.

If it is desired to remove the water formed during the reaction at a temperature lower than about 100° C., it is favorable to operate under reduced pressure. The reaction can likewise be carried out under superatmospheric pressure, but this method will, in general, be dispensed with, considering the apparatuses necessary for this purpose.

The technical progress of the process is obvious. By omitting the solvent, the expenses for the apparatuses and material are considerably reduced; in addition to the simplified operation method the costs of the product are diminished.

The following examples serve to illustrate the invention but they are not destined to limit it thereto:

*Example 1*

24.27 kilograms of tributyl-tinchloride are introduced into a stainless steel vessel having a capacity of 100 liters, and within about 30 minutes 3.22 kilograms of solid caustic soda of 99% strength are stirred in, the temperature of the mixture rising to about 70° C. due to the evolution of heat during the reaction. The mixture is heated for 6 further hours to about 110° C., allowed to cool, filtered off from the sodium chloride that has formed, and the small amount of water formed in the course of the reaction is distilled off by again heating the mixture to about 110° C. There remain behind 18.6 kilograms of the liquid crude hexabutyl-distannoxane which is purified by distillation. Yield: 77% of the theoretical yield.

*Example 2*

A flask provided with stirrer and having a capacity of 3 liters is charged with 500 grams of tributyl-tinchloride and 58 grams of solid calcium hydroxide are stirred in within 15 minutes. The mixture is then heated for a further 2 hours to about 110° C., the water formed in the course of the reaction being gradually removed. The mixture is filtered off from the calcium chloride that has formed, and there are obtained 421 grams of hexabutyl-distannoxane as crude product which is purified in known manner. Yield: 85% of the theory.

*Example 3*

300 grams of tributyl-tinbromide are introduced into a flask provided with stirrer and having a capacity of 2 liters. 46 grams of solid potassium hydroxide of about 99% strength are added while stirring. The mixture is heated for 3 hours to about 100° C. and the water formed as reaction product is thus removed. The potassium bromide now formed is separated off by filtration and 216 grams of crude hexabutyl-distannoxane are obtained. After purification by distillation the yield amounts to 82% of the theory.

Example 4

In a suitable flask provided with stirrer 15 grams of caustic soda of 99–100% strength are gradually added to 100 grams of tri-n-propyl-tinchloride whereafter a temperature raise to about 60° C. is observed. By subsequently heating the mixture for two hours to about 110° C., the water formed during the reaction is removed. The sodium chloride formed is now filtered off and 81 grams of crude hexa-n-propyl-distannoxane are obtained as filtrate. After purification by distillation the yield amounts to 79% of the theory.

Example 5

A flask provided with stirrer is charged with 120 grams of tributyl-tiniodide and 11.5 grams of solid sodium hydroxide of about 99% strength are gradually added while stirring. The temperature thereby rises to about 40° C. The mixture is further heated for 10 hours to about 110° C. and the water formed during the reaction is removed. The sodium iodide that has formed is filtered off and 65 grams of crude hexabutyl-distannoxane are obtained which are purified by distillation under reduced pressure. The yield of pure product amounts to 70% of the theory.

I claim:

Process for the manufacture of liquid hexaalkyl-distannoxanes by simultaneously saponifying and dehydrating a liquid trialkyltin-halide which comprises heating a liquid trialkyltin-halide selected from the group consisting of trialkyltin-chlorides, trialkyltin-bromides and trialkyltin-iodides together with a solid alkaline agent selected from the group consisting of sodium hydroxide, potassium hydroxide and calcium hydroxide, in the absence of any organic solvents, distilling off the water from dehydration, and separating the reaction products from the solid alkaline halide formed.

References Cited in the file of this patent

UNITED STATES PATENTS

| | | |
|---|---|---|
| 2,862,944 | Gloskey | Dec. 2, 1958 |
| 2,868,820 | Nitzsche et al. | Jan. 13, 1959 |

FOREIGN PATENTS

| | | |
|---|---|---|
| 753,998 | Great Britain | Aug. 1, 1956 |

OTHER REFERENCES

Luijten et al.: "Investigations in the Field of Organotin Chem." Published by Tin Research Inst., Middlesex, England (October 1955), pages 106–111.

Chem. Rev. 60, No. 5 October 1960, pages 490–493 and 525–539.